I. BROOKS,

Assignor to THE SAWYER WOOLEN MILLS.

Cloth-Shearing Machine.

No. 8,554. Reissued Jan. 28, 1879.

WITNESSES
A. J. Gettinger
A. F. Gleason

Isaac Brooks INVENTOR
by his attys
Clarke & Raymond

N. PETERS, PHOTO-LITHOGRAPHER, WASHINGTON, D. C.

UNITED STATES PATENT OFFICE.

ISAAC BROOKS, OF DOVER, NEW HAMPSHIRE, ASSIGNOR TO THE SAWYER WOOLEN MILLS.

IMPROVEMENT IN CLOTH-SHEARING MACHINES.

Specification forming part of Letters Patent No. 183,897, dated October 31, 1876; Reissue No. 8,554, dated January 28, 1879; application filed July 29, 1878.

*To all whom it may concern:*

Be it known that I, ISAAC BROOKS, of Dover, New Hampshire, have invented an Improvement in Cloth-Shearing Machines, of which the following is a specification:

This invention relates to an attachment to cloth-shearing machines to protect the selvage from the action of the shearing-knives. It is here applied to the Woolson cloth-shearing machine, patented August 16, 1864.

Figure 1:
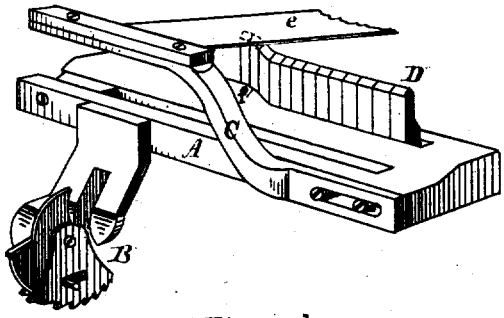
Figure 2:
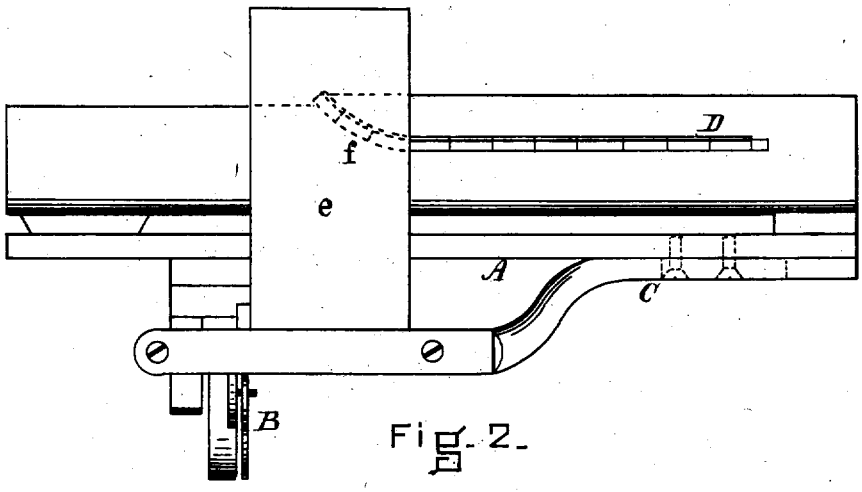

In the drawings, Figure 1 is an illustration, in perspective, of the gage-bar feelers and rest with this attachment applied, and Fig. 2 is a plan thereof.

A is the gage-bar. B represents the feelers, and D is the movable rest upon which the cloth is sheared. At *f* is the angle of the rest over which the selvage runs. All these parts are similar to the parts in the Woolson machine.

In shearing cloth with a long-fibered selvage, the fibers are very apt to be cut, and my invention is to attach to the gage-bar A a bracket, C, carrying a strip of thin flexible material, *e*, which covers the selvage in the operation of shearing, and protects the fibers from destruction.

The flexible material used as a guard in protecting the fibers may be a strip of paper, a thin smooth cloth, or other suitable fabric.

I claim—

In a cloth-shearing machine, the combination, with the rest D, of a slip of thin smooth flexible material, arranged to extend over the selvage of the cloth at the angle of the rest, and to protect the fibers of the selvage, all substantially as described.

ISAAC BROOKS.

Witnesses:

JAMES B. BARNES,
CHAS. H. FOSS.